Figure 2:
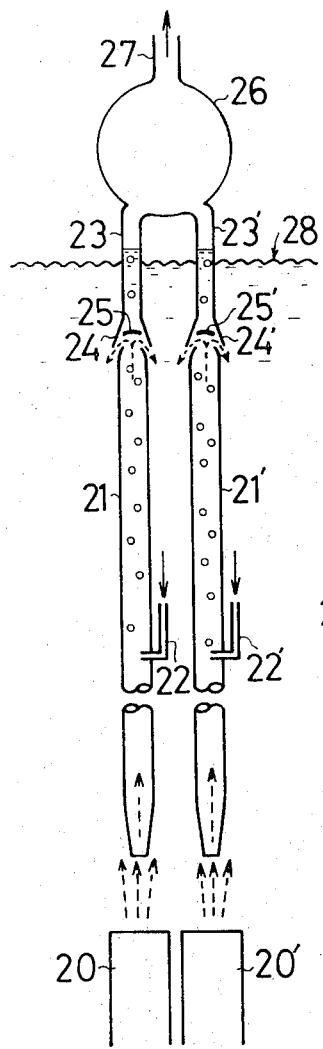

United States Patent [19]

Tomabechi

[11] 3,856,620
[45] Dec. 24, 1974

[54] METHODS OF AND APPARATUS FOR DETECTING A FAILED FUEL ASSEMBLY

[75] Inventor: Ken Tomabechi, Tokyo, Japan

[73] Assignee: Doryokuro Kakunenryo Kaikatsu Jigyodan, Tokyo, Japan

[22] Filed: May 15, 1972

[21] Appl. No.: 253,114

[30] Foreign Application Priority Data
May 20, 1971 Japan................................ 46-34335

[52] U.S. Cl. .................................................. 176/19
[51] Int. Cl............................................ G21c 17/00
[58] Field of Search...................... 176/19 LD, 19 R

[56] References Cited
UNITED STATES PATENTS

| | | | |
|---|---|---|---|
| 3,070,532 | 12/1962 | Zebroski.......................... | 176/19 LD |
| 3,164,569 | 12/1964 | Donguy et al. .................. | 176/19 LD |
| 3,178,355 | 4/1965 | Jacobs............................ | 176/19 LD |
| 3,200,041 | 8/1965 | Ralfe et al. ..................... | 176/19 LD |
| 3,219,536 | 11/1965 | Butler et al..................... | 176/19 LD |
| 3,234,101 | 2/1966 | Berthod.......................... | 176/19 LD |
| 3,632,470 | 1/1972 | Rubin............................. | 176/19 LD |

Primary Examiner—Carl D. Quarforth
Assistant Examiner—P. K. Pavey
Attorney, Agent, or Firm—Wenderoth, Lind & Ponack

[57] ABSTRACT

A method of detecting a failed fuel assembly in a nuclear reactor is disclosed which comprises separately sampling the coolant flowing out of a plurality of fuel assemblies; blowing a carrier gas into each of said coolant samples; collecting all of said carrier gas after separating the gas from said coolant; detecting radioactivity of said collected gas; and then separately detecting radioactivity of each of said carrier gas samples by blowing a carrier gas into each of said coolant samples seriatim in the event the collected gas is found to be radioactive. Also, an apparatus for detecting a failed fuel assembly in a nuclear reactor is provided which comprises a plurality of tubes to separately sample the coolant which is flowing out of a plurality of fuel assemblies and to extract the fission products by means of a carrier gas from said coolant samples; a plurality of gas blowing means each having a valve means through which said carrier gas can be blown into said sampled coolant seriatim; a gas collecting chamber associating with said tubes to collect gas blown into said coolant samples; and means for detecting radioactivity of said collected gas.

3 Claims, 2 Drawing Figures

METHODS OF AND APPARATUS FOR DETECTING A FAILED FUEL ASSEMBLY

This invention relates to methods of and apparatus for detecting a failed fuel assembly in a nuclear reactor, and more particularly to methods of and apparatus for easily and promptly detecting a certain failed fuel assembly among a plurality of fuel assemblies in a nuclear reactor, wherein fission products are produced and released into a coolant due to a failure of a fuel assembly.

In order to detect a failure of a fuel assembly in a nuclear reactor in which a plurality of fuel assemblies are cooled by a liquid coolant such as liquid sodium, the prior art discloses the method of separately sampling the coolant which flows out of each of the fuel assemblies to detect the radioactivity of fission products which are produced by the failure of the fuel assembly and released into the coolant. The fuel assemblies are, therefore, provided with individual sampling tubes to sample the coolant from the individual fuel assemblies, and the sampled coolant is introduced through conduit pipes into means for detecting radioactivity and any radioactivity is detected by the radiation detector means. In such case, it is necessary to provide a plurality of conduits to introduce the sampled coolant into the radiation detector and switching valves to change the flow of the coolant through the conduits to the radiation detection seriatim. Consequently, the detecting operation relative to the coolant from any particular fuel assembly is carried out intermittently because a flow of the coolant through a particular conduit must be switched intermittently by means of the switching valve.

Furthermore, since the coolant such as liquid sodium is difficult to handle because of its chemical properties and because of the intense radioactivity, such conduits and switching valves as described above have to be highly reliable and are, consequently, difficult to construct and operate in practice.

It is also known to provide each of the conduits carrying coolant with a radiation detector, whereby the detective operation can be carried out continuously. However, many radiation detectors are then necessary and the difficulties encountered in handling liquid sodium still remain.

An object of the present invention is, therefore, to provide new and improved methods of and apparatus for easily, promptly and continuously detecting a failed fuel assembly in a nuclear reactor.

Another object of the present invention is to provide methods of and apparatus for easily detecting and identifying a particular failed fuel assembly among a plurality of fuel assemblies in a nuclear reactor, if a failure of any of the fuel assemblies is detected.

A further object of the present invention is to provide methods of and apparatus for detecting a failed fuel assembly in a nuclear reactor, wherein a liquid coolant flowing out of a fuel assembly does not need to be directly subjected to a detecting operation which is performed by a radiation detector.

According to the present invention, a method of detecting a failed fuel assembly in a nuclear reactor is provided which comprises separately sampling coolant flowing out of a plurality of fuel assemblies; blowing a carrier gas into each of said coolant samples; collecting all of said carrier gas after separating it from said coolant; detecting radioactivity of said collected gas; and then individually detecting the existance of radioactivity in the carrier gas samples separated from each coolant stream by blowing a carrier gas into each of said coolant samples one at a time in the event radioactivity is detected in the collected gas.

According to the present invention, an apparatus for detecting a failed fuel assembly in a nuclear reactor is provided which comprises a plurality of tubes to separately sample coolant flowing out of each of a plurality of fuel assemblies and to extract the fission products by means of a carrier gas; a plurality of gas blowing means each having a valve means through which said carrier gas can be blown seriatim into said sampled coolant; a gas collecting chamber associating with said sampling tubes to collect gas blown into said sampled coolant; and means for detecting the radioactivity of said collected gas.

Figure 1:
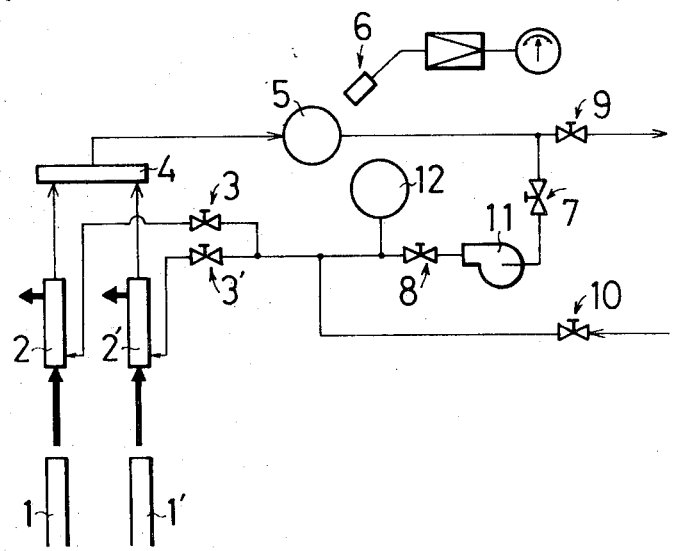

A clear understanding of the present invention may be obtained from the following detailed description in conjunction with the accompanying drawings, in which:

FIG. 1 is a flow sheet showing the principles of the invention, and FIG. 2 is a schematic view illustrating an arrangement of a part of an apparatus embodying the invention.

Referring now in detail to the drawings, a flow sheet illustrated in FIG. 1 includes only two fuel assemblies and omits other fuel assemblies for the purpose of the explanation. A liquid coolant such as liquid sodium which flows upwardly through each of the fuel assemblies 1,1' in a nuclear reactor (not shown) is sampled by using means for separately sampling the coolant. Broad arrows in FIG. 1 show the flow of the sampled coolant. A carrier gas such as argon gas or helium gas is blown separately through valves 3,3' by means of a pump 11 into the respective coolant samples. The coolant, containing the carrier gas in bubbles, then flows up in gas extracting tubes 2,2' respectively, and here the carrier gas is separated from the coolant. All of the separated carrier gas samples are collected in a header 4, while all of the residual coolant flows back into the main coolant body. The collected gas thus obtained is introduced into a tank 5 and then is circulated through valves 7 and 8, and valves 3 or 3' into the coolant samples. The circulation of the carrier gas is provided by the pump 11. The detecting operation is carried out by means of a radiation detector 6 when the collected gas is introduced into the tank 5.

In the case described above, valves 3,3',7 and 8 are opened in order to circulate the collected gas after examining the gas to determine whether or not it is radioactive.

A numeral 12 denotes a buffer tank for the carrier gas.

The circulating carrier gas can be replaced by fresh carrier gas by opening an exhaust valve 9 and a feeding valve 10 which feeds fresh carrier gas into the circulation system and, at the same time, by closing valves 7 and 8. If desired, the carrier gas input through feeding valve 10 may be discharged through the exhaust valve 9 after flowing through the valve 3 or 3', the gas extracting tubes 2 or 2', the header 4 and tank 5. In this case the carrier gas is not circulated.

Assuming that a failure occurs in a certain fuel assembly in a nuclear reactor, the coolant which flows out of the broken fuel assembly will contain fission products released by the failure. When the carrier gas is blown into the coolant which contains the fission products, gaseous ingredients of the products will be extracted by the carrier gas as the carrier gas is extracted through the gas extracting tubes 2, 2'. The radiation detector 6 will, therefore, be able to detect these gaseous fission products which are extracted by the carrier gas introduced into the tank 5.

If a failure of any fuel assemblies is detected by the radiation detector 6, it is then necessary to determine which fuel assembly has failed. To identify the particular fuel assembly which has failed, one of the valves 3,3' is kept open and the other valve is closed. When the valve 3, for example, is kept, open and the valve 3' is closed, the carrier gas introduced into the tank 5 is the gas that has been blown into the coolant flowing out of the fuel assembly 1, that is, only the radioactivity of the carrier gas from the fuel assembly 1 can be detected. Next, the valve 3' is opened and the valve 3 is closed, so that only the radioactivity of the carrier gas from the fuel assembly 1' can be detected. In the manner described above, the particular failed fuel assembly can be identified easily and promptly.

In the practical case where more than two fuel assemblies are provided in the nuclear reactor, means for separately sampling the coolant flowing out of each of the fuel assemblies and corresponding valves for separately blowing the carrier gas into each of the coolant samples may be provided for each of the fuel assemblies.

FIG. 2 illustrates an embodiment of a part of an apparatus according to the invention in which an arrangement of coolant outlets from fuel assemblies, means for separately sampling such coolant and the header are schematically shown. A plurality of tubes 21,21' are used as the means for sampling the coolant. The tubes are uprightly placed over a plurality of coolant outlets 20, 20' respectively, at a suitable distance. Gas blowing pipes 22,22', through which the carrier gas is separately blown into the coolant samples, are connected to the tubes 21,21', respectively, at the side portions thereof. Upper and bottom open ends of the tubes 21,21' are slightly tapered and conduits 23,23' having outwardly spread open ends bottom 24, 24', respectively, are placed uprightly over the tubes 21, 21', respectively, so that conduits cover the upper open tapered ends of the tubes 21,21' at a suitable distance. In the inner portions of the bottom open outwardly spread ends 24,24' baffle plates 25,25' are provided, respectively over the upper open ends of the tubes 21,21'. All of the conduits 23,23' are connected to the header 26 which is placed over the surface 28 of the unsampled coolant and is provided at the upper portion thereof with a gas pipe 27 for introducing the gas collected here into the tank 5 in FIG. 1. The header is not necessarily arranged over the surface 28 of the coolant, rather its arrangement depends on the pressure in the reactor and the pressure of the carrier gas.

The movements of the coolant and the carrier gas in the apparatus described above is as follows; a part of the coolant flowing out of the respective outlets 20,20' is separately sampled and flows up into the tubes 21,21', respectively, through bottom openings thereof, as indicated by dotted arrows. The carrier gas is blown separately through the gas blowing pipes 22,22' into the coolant sampled in the tubes 21,21'. The coolant, containing the carrier gas in bubbles, flows up the tubes 21,21' and impacts the baffle plates 25, 25', respectively. Most of the sampled coolant is allowed to escape in the directions as indicated by dotted arrows and to mix with the coolant pool. At the same time, the baffle plates 25,25' prevent the coolant and the carrier gas from flowing rapidly up to the header 26. The carrier gas together with the coolant which has not escaped flows up through the respective conduit pipes 23, 23' and is separated from the coolant and collected into the header 26. The gas collected is then introduced through the gas pipe 27 into the tank 5 in FIG. 1 in order to detect its radioactivity. When fission products have been produced and released in the coolant, the extraction of gaseous ingredients of the products by means of the carrier gas is carried out substantially in the upper portions of the tubes 21, 21' and also partly in the conduit pipes 23,23' while the carrier gas and the coolant are flowing upwardly therethrough.

The dimensions of the apparatus, the flow rate of the coolant and the carrier gas, and the operative pressure and temperature in the apparatus may be suitably chosen in accordance with the operative conditions of the nuclear reactor.

The liquid coolant applied to the invention is not limited to liquid sodium, but may also consist of water or the like. Nitrogen gas or air may also be used as a carrier gas.

From the foregoing description it is apparent that this invention provides simple and economical methods of and apparatus for detecting a failed fuel assembly in a nuclear reactor wherein, by extracting gaseous ingredients of fission products which are released in the coolant by means of the carrier gas which is blown into the coolant, the coolant flowing out of a fuel assembly is not directly subjected to a detection operation. Therefore, conduits to convey the coolant to the radiation detector and switching valves to change the flow of the liquid coolant seriatum are unnecessary, so that the detecting operation can be carried out easily without any difficulties due to the chemical properties and the intense radioactivity of the liquid coolant.

It will be understood that the foregoing description and embodiments are not intended to restrict the scope of the present invention and the invention should be construed as limited only to the extent indicated by the appended claims.

What is claimed is:

1. An apparatus for detecting a failed fuel assembly in a nuclear reactor, which comprises a plurality of tubes to separately sample coolant flowing out of a plurality of fuel assemblies and to extract fission products by means of a carrier gas from said sampled coolant; a plurality of gas blowing means each having a valve means through which said carrier gas can be blown into said sampled coolant, each of said valve means being independent of the others of said valve means such that said valve means can be opened at the same time or one at a time; means for releasing most of said sampled coolant outside of said tubes, comprised of a plurality of conduits each having an outwardly spread open end and a baffle plate, each of said conduits being placed over each of said tubes so that said outwardly spread open end covers said open upper end of each of said tubes at a suitable distance, said baffle plate being placed over said open upper end of each of said tubes within the inner portion of said outwardly spread open end; a gas collecting chamber associated with said conduits to collect gas blown into said coolant samples;

means for detecting radioactivity of said collected gas; and means for circulating said collecting gas to said gas blowing means after determining its radioactivity.

2. An apparatus according to claim 1, wherein each of said gas blowing means is a gas blowing pipe connected to each of said tubes at the side portion thereof.

3. An apparatus according to claim 1, wherein upper and bottom open ends of said tubes are slightly tapered.

* * * * *

UNITED STATES PATENT OFFICE
CERTIFICATE OF CORRECTION

Patent No. 3,856,620            Dated December 24, 1974

Inventor(s) KEN TOMABECHI

It is certified that error appears in the above-identified patent and that said Letters Patent are hereby corrected as shown below:

The name of the Assignee should be shown as

DORYOKURO KAKUNENRYO KAIHATSU JIGYODAN rather than

Doryokuro Kakunenryo Kai<u>k</u>atsu Jigyodan.

Signed and Sealed this

Tenth Day of August 1976

[SEAL]

Attest:

RUTH C. MASON
*Attesting Officer*

C. MARSHALL DANN
*Commissioner of Patents and Trademarks*